(12) United States Patent
Tang et al.

(10) Patent No.: US 8,777,461 B2
(45) Date of Patent: Jul. 15, 2014

(54) BACKLIGHT MODULE AND LIQUID CRYSTAL DISPLAY

(75) Inventors: Guofu Tang, Guandong (CN); Yu-chun Hsiao, Guandong (CN)

(73) Assignee: Shenzhen China Star Optoelectronics Technology co., Ltd., Shenzhen, Guangdong (CN)

( * ) Notice: Subject to any disclaimer, the term of this patent is extended or adjusted under 35 U.S.C. 154(b) by 154 days.

(21) Appl. No.: 13/640,738

(22) PCT Filed: Aug. 6, 2012

(86) PCT No.: PCT/CN2012/079716
§ 371 (c)(1),
(2), (4) Date: Oct. 12, 2012

(87) PCT Pub. No.: WO2014/019243
PCT Pub. Date: Feb. 6, 2014

(65) Prior Publication Data
US 2014/0036202 A1    Feb. 6, 2014

(30) Foreign Application Priority Data
Jul. 31, 2012  (CN) .......................... 2012 1 0271249

(51) Int. Cl.
*G02F 1/1335*  (2006.01)
*G02F 1/1333*  (2006.01)

(52) U.S. Cl.
CPC ........ *G02F 1/133385* (2013.01); *G02B 6/0011* (2013.01)
USPC ............................................. 362/373; 349/65

(58) Field of Classification Search
USPC ............................................. 362/373; 349/65
See application file for complete search history.

*Primary Examiner* — Phu Vu
(74) *Attorney, Agent, or Firm* — Andrew C. Cheng

(57) ABSTRACT

The present invention discloses a backlight module and a liquid crystal display (LCD). The backlight module includes a backplane, a light guide plate, a heat dissipation element and a connector. The light guide plate is disposed on the side of the backplane. The heat dissipation element includes a horizontal part and a vertical part interconnected to each other. The horizontal part is disposed on the other side of the backplane away from the light guide plate, and the vertical part is disposed next to light incident surface of the light guide plate. The light source is disposed on the side of the vertical part close to light incident surface. The connector connects the heat dissipation element to the backplane and allows the heat dissipation element to move relatively to the backplane in the gap direction between the light guide plate and the light source. Through this way, the backlight module and LCD according to the present invention can effectively prevent the light guide plate to squeeze the light source and reduce the temperature of the light source.

20 Claims, 2 Drawing Sheets

BACKLIGHT MODULE AND LIQUID CRYSTAL DISPLAY

FIELD OF THE INVENTION

The present invention relates to the field of display technology, in particular, relates to a backlight module and a liquid crystal display.

BACKGROUND OF THE INVENTION

Liquid crystal display (LCD) with low operating voltage, low radiation and power consumption advantages, it is widely used in various fields including computers, mobile phones, televisions, and measurements show that the field. LCD includes LCD panel and backlight module and so on. LCD panel itself is not illuminated, and the backlight module is required to provide backlight for display.

In the existing technology of the backlight module, light guide plate expansion will be squeezed to light source. It may result in light source compressive deformation which is making the light source internal circuit abnormal and easily making light source damage by expansion due to heat or moisture. Moreover, because the light source will produce high temperature, light source surface temperature is very high, sometimes up to 80 degrees. The light source framework and sealant may be in the non-rigid state, and the light guide plate thermal expansion may be forcedly oppressed to light source deformation. The gap space between the light guide plate and the light source will become closer, and then make the light guide plate bear the high light source surface temperature. The glass transition temperature of the light guide plate is generally less than 90 degrees. When the display module is placed in an ambient temperature of 40 degrees, the light guide plate may bear the light source surface temperature over 90 degrees. It will exceed the glass transition temperature of the light guide plate. At this time the light guide plate will soften and destroy the total reflection angle of the light guide plate.

Therefore, it is necessary to provide a backlight module and an LCD to solve the above problems.

SUMMARY OF THE INVENTION

The present invention is to provide a backlight module and an LCD which can effectively prevent the light guide plate to squeeze the light source and effectively reduce the temperature of the light source.

In order to solve these problems, technical solutions disclosed in this invention are: to provide a backlight module, the backlight module comprises: a backplane; a light guide plate, and said light guide plate is disposed on the side of the backplane; a heat dissipation element, and said heat dissipation element includes a horizontal part and a vertical part interconnected to each other, and said horizontal part is disposed on the other side of said backplane away from said light guide plate, and said vertical part is disposed next to light incident surface of said light guide plate; a light source, and said light source is disposed on the side of said vertical part close to said light incident surface; a connector, and said connector connects said heat dissipation element to said backplane and allows said heat dissipation element to move relatively to said backplane in the gap direction between said light guide plate and said light source, and said horizontal part is provided with through hole, and said connector comprising the first connecting portion fixed on said backplane, the second connecting portion connected with said first connecting portion and disposed in said through hole, and the third connecting portion connected with said second connecting portion and supported on the side of said horizontal part away from said backplane, and said through hole size in the gap direction is greater than the size of said second connecting portion in said gap direction, and said through hole size in the gap direction is greater than said through hole size perpendicular to said gap direction which is parallel to said backplane, and said through hole size perpendicular to said gap direction which is parallel to said backplane is greater than the size of said second connecting portion perpendicular to said gap direction and less than the size of said third connecting portion perpendicular to said gap direction.

Wherein, the first connecting portion, said second connecting portion and said third connecting portion are three coaxial cylinders.

Wherein, the connector is a screw, and a threaded hole is disposed on said backplane, and said first connecting portion of said connector connects to said backplane by said screw and are fixed in said threaded hole.

Wherein, the backplane further comprises a protrusion toward said horizontal part, and said threaded hole is provided in said protrusion, and said horizontal part provides with a concave used to put on said protrusion, and said concave size in said gap direction is greater than said protrusion size in said gap direction.

Wherein, the horizontal part and said vertical part are formed integrally.

Wherein, the backlight module further comprises the reflective film between said light guide plate and said backplane, and the optical film of said light guide plate away from the side of said backplane.

In order to solve above problems, another technical solutions disclosed in this invention are: to provide a backlight module, the backlight module comprises: a backplane, a light guide plate, a heat dissipation element, a light source, and a connector; wherein said light guide plate is disposed on the side of said backplane, and said heat dissipation element includes a horizontal part and a vertical part interconnected to each other, and said horizontal part is disposed on the other side of said backplane away from said light guide plate, and said vertical part is disposed next to light incident surface of said light guide plate, and said light source is disposed on the side of said vertical part close to said light incident surface, and said connector connects said heat dissipation element to said backplane and allows said heat dissipation element to move relatively to said backplane in the gap direction between said light guide plate and said light source.

Wherein, said horizontal part is provided with through hole, and said connector comprising the first connecting portion fixed on said backplane, the second connecting portion connected with said first connecting portion and disposed in said through hole, and the third connecting portion connected with said second connecting portion and supported on the side of said horizontal part away from said backplane, and said through hole size in the gap direction is greater than the size of said second connecting portion in said gap direction.

Wherein, said through hole size in the gap direction is greater than said through hole size perpendicular to said gap direction which is parallel to said backplane.

Wherein, said through hole size perpendicular to said gap direction which is parallel to said backplane is greater than the size of said second connecting portion perpendicular to said gap direction and less than the size of said third connecting portion perpendicular to said gap direction.

Wherein, said first connecting portion, said second connecting portion and said third connecting portion are three coaxial cylinders.

Wherein, the connector is a screw, and a threaded hole is disposed on said backplane, and said first connecting portion of said connector connected to said backplane by said screw and are fixed in said threaded hole.

Wherein, the backplane further comprises a protrusion toward said horizontal part, and said threaded hole is provided in said protrusion, and said horizontal part provides with a concave used to put on said protrusion, and said concave size in said gap direction is greater than said protrusion size in said gap direction.

Wherein, said horizontal part and said vertical part are formed integrally.

Wherein, the backlight module further comprises the reflective film between said light guide plate and said backplane, and the optical film of said light guide plate away from the side of said backplane.

In order to solve above problems, another technical solutions disclosed in this invention are: to provide an LCD, the LCD includes a backlight module, said backlight module comprises: a backplane; a light guide plate, and said light guide plate is disposed on one side of said backplane; a heat dissipation element, and said heat dissipation element includes a horizontal part and a vertical part interconnected to each other, and said horizontal part is disposed on the other side of said backplane away from said light guide plate, and said vertical part is disposed next to light incident surface of said light guide plate; a light source, and said light source is disposed on the side of said vertical part close to said light incident surface; a connector, and said connector connects said heat dissipation element to said backplane and allows said heat dissipation element to move relatively to said backplane in the gap direction between said light guide plate and said light sources.

Wherein, said horizontal part is provided with through hole, and said connector comprising the first connecting portion fixed on said backplane, the second connecting portion connected with said first connecting portion and disposed in said through hole and the third connecting portion connected with said second connecting portion and supported on the side of said horizontal part away from said backplane, and said through hole size in the gap direction is greater than the size of said second connecting portion in said gap direction.

Wherein, said through hole size in the gap direction is greater than said through hole size perpendicular to said gap direction which is parallel to said backplane.

Wherein, said through hole size perpendicular to said gap direction which is parallel to said backplane is greater than the size of said second connecting portion perpendicular to said gap direction and less than the size of said third connecting portion perpendicular to said gap direction.

Wherein, the connector is a screw, and a threaded hole is disposed on said backplane, and said first connecting portion of said connector connects to said backplane by said screw and are fixed in said threaded hole. The backplane further comprises a protrusion toward said horizontal part, and said threaded hole is provided in said protrusion, and said horizontal part provides with a concave used to put on said protrusion, and said concave size in said gap direction is greater than said protrusion size in said gap direction.

The beneficial effects of the present invention are: different from existing technology, the present invention can make the heat dissipation element relatively move to the backplane in the gap direction between the light guide plate and the light source and thus prevent the light guide plate to squeeze the light source. In the meanwhile, through the horizontal part of the heat dissipation element disposed on the outer surface of the backplane away from the light guide plate, it may make the heat dissipation element and the outside air in direct contact to speed up the heat dissipation process and reduce the temperature of the light source.

DETAILED DESCRIPTION OF PREFERRED EMBODIMENT

In the following detailed description of the preferred embodiment of the present invention, reference is made to the accompanying drawings.

Figure 1:
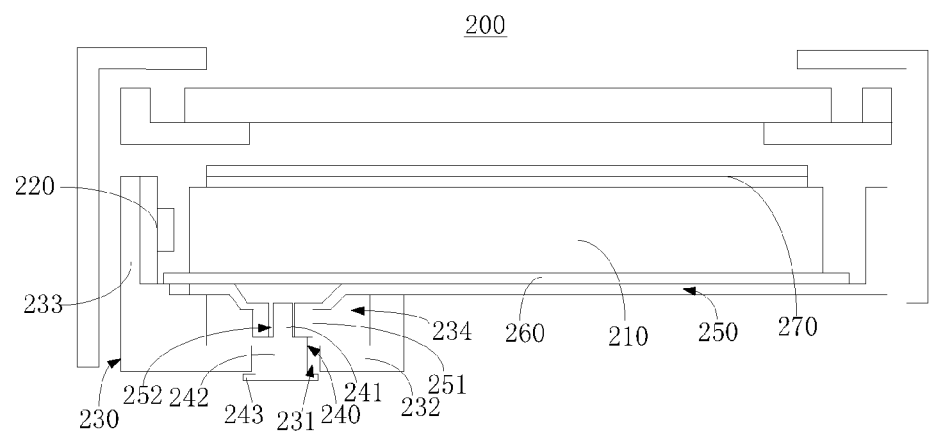
FIG. 1 is an assembled view showing the backlight module in accordance with an embodiment of the present invention.

FIG. 1 is a schematic diagram of a backlight module 200 of one embodiment of the present invention. As shown in FIG. 1, the backlight module 200 comprises: a backplane 250, a light guide plate 210, a heat dissipation element 230, a connector 240, a reflective film 260, an optical film 270 and a light source 220.

The light guide plate 210 is disposed on the side of the backplane 250, and the reflective film 260 is disposed between the light guide plate 210 and the backplane 250 by adhesive or other means. The optical film 270 can also be disposed by adhesive or other means on the light guide plate 210 away from the side of the backplane 250.

The heat dissipation element 230 includes a horizontal part 232 and a vertical part 233 interconnected to each other. The horizontal part 232 and the vertical part 233 are formed integrally. In this embodiment, the horizontal part 232 and the vertical part 233 are perpendicular to each other by 90 degrees. In other embodiments, the horizontal part 232 and the vertical part 233 are interconnected by any angles or curved connection based on the requirement. The horizontal part 232 is disposed on the other side of the backplane 250 away from the light guide plate 210, and through hole 231 is inside the horizontal part 232. The vertical part 233 is disposed next to light incident surface of the light guide plate 210. The light source 220 is disposed on the side of the vertical part 233 close to light incident surface.

The connector 240 connects the heat dissipation element 230 to the backplane 250 and allows the heat dissipation element 230 to move relatively to the backplane 250 in the gap direction between the light guide plate 210 and the light source 220. The connector 240 comprises the first connecting portion 241, the second connecting portion 242 and the third connecting portion 243. The first connecting portion 241 is fixed on the backplane 250. The second connecting portion 242 is connected with the first connecting portion 241 in the through hole 231. The third connecting portion 243 is connected with the second connecting portion 242 and supported on the side of the horizontal part 232 away from the backplane 250. The first connecting portion 241, the second connecting portion 242 and the third connecting portion 243 are three coaxial cylinders.

The backplane 250 comprises the protrusion 251 toward the horizontal part 232. In this embodiment, the connector 240 is a screw. The threaded hole 252 is provided in the protrusion 251. The first connecting portion 241 of the connector 240 is fixed in the threaded hole 252 locked by screw.

The horizontal part 232 provides the concave 234 used to put on the protrusion 251. The size of concave 234 in the gap direction is greater than the size of the protrusion 251 in said gap direction.

Figure 2:
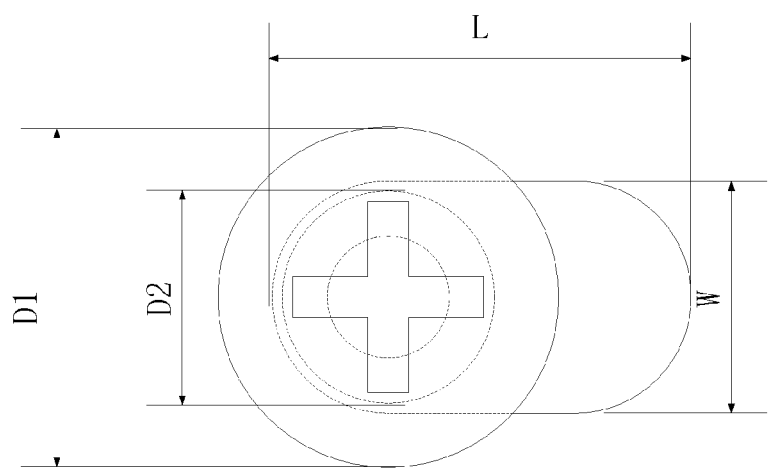
FIG. 2 is a perspective bottom view showing the connector of the backlight module in FIG. 1.

In order to make the backplane 250 and the heat dissipation element 230 accurately fixed in the backlight module 200 by using the connector 240, the size parameters of the connector 240 requires a certain limit. FIG. 2 is the perspective bottom view of the connector 240 of the backlight module 200 in FIG. 1.

Referred to FIG. 2 and FIG. 1, the through hole 231 in the gap direction size L is greater than the size W on the through hole 231 perpendicular to said gap direction which is parallel to backplane 250. In other words, the length L of the through hole 231 is greater than the width W of the through hole 231. Because the second connecting portion 242 is disposed in the through hole 231, the size W of the through hole 231 perpendicular to the gap direction which is parallel to the backplane 250 is greater than the size D2 of the second connecting portion 242 perpendicular to said gap direction which is parallel to the backplane 250. In other words, the width W of the through hole 231 is greater than the diameter D2 of the second connecting portion 242. The size W of the through hole 231 perpendicular to the gap direction which is parallel to the backplane 250 is less than the size D1 of the third connecting portion 243 perpendicular to said gap direction which is parallel to the backplane 250. Because the third connecting portion 243 is a cylinder, the vertical size D1 of the third connecting portion 243 is the diameter D1 of the third connecting portion. In other words, the width W of the through hole 231 is less than the diameter D1 of the third connecting portion. This design makes the third connecting portion 243 get stuck the heat dissipation element 230 to let the heat dissipation element 230 be stable in the gap direction and not move outward. With regard to the relationship between the length L of the through hole 231 and the diameter D1 of the third connection 243, the length L of the through hole 231 can be either greater than the diameter D1 of the third connecting portion 243 or less than the diameter D1 of the third connecting portion 243.

Figure 3:
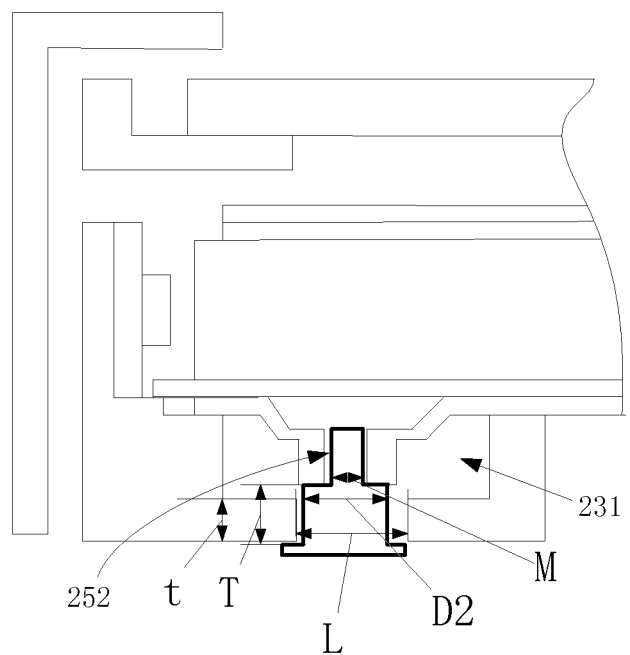
FIG. 3 is an enlarged view of the connector in FIG. 1.

In order to more clearly understand the size parameters between the backlight module 200 and other components, please refer to FIGS. 1 and 3. FIG. 3 is an enlarged view of the connector 240 in FIG. 1. The first connecting portion 241 may be fixed in the threaded hole 252 through the screw. The diameter M of the first connecting portion 241 may be slightly equal to the diameter of the threaded hole 252 (not shown). Because the heat dissipation element 230 is movable, the size L of the through hole 231 of the heat dissipation element 230 in the gap direction is greater than the size D2 of the second connecting portion 242 in said gap direction. In other words, the length L of the through hole 231 is greater than the diameter D2 of the second connecting portion 242. Thus, the heat dissipation element 230 can have enough space to move after the light guide plate 210 produces expansion due to heat or moisture. Because the second connecting portion 242 passed through the through hole 231, the thickness T of the second connecting portion 242 is greater than or slightly greater than the thickness t of the through hole 231. It may make the heat dissipation element 230 easily disposed in the through hole 231.

The present invention further provides LCD display which is using the above-mentioned backlight, such as LCD TV or LCD computer.

To sum up, LCD and backlight module according to the present invention can make the heat dissipation element relatively move to the backplane in the gap direction between the light guide plate and the light source. It can avoid squeezing the light source due to the light guide plate expansion. Moreover, through the horizontal part of the heat dissipation element disposed on the outer surface of the backplane away from the light guide plate, it may have the heat dissipation element and the outside air in direct contact to speed up the heat dissipation process and reduce the temperature of the light source.

The foregoing description of the preferred embodiments of the present invention is not to limit the scope or meaning of the claims of this invention. Any use of the equivalent structure and drawings of the specification or the equivalent process transformation of the present invention, directly or indirectly used in other related technical areas, are the same reason in the present invention within the scope of patent protection.

What is claimed is:

1. A backlight module, wherein said backlight module comprising:
   a backplane;
   a light guide plate, wherein said light guide plate is disposed on one side of said backplane;
   a heat dissipation element, wherein said heat dissipation element includes a horizontal part and a vertical part interconnected to each other, and said horizontal part is disposed on the other side of said backplane away from said light guide plate, and said vertical part is disposed next to light incident surface of said light guide plate;
   a light source, wherein said light source is disposed on one side of said vertical part close to said light incident surface;
   a connector, wherein said connector connects said heat dissipation element to said backplane and allows said heat dissipation element to move relatively to said backplane in the gap direction between said light guide plate and said light source, and said horizontal part is provided with through hole, and said connector comprises the first connecting portion fixed on said backplane, the second connecting portion connected with said first connecting portion and disposed in said through hole and the third connecting portion connected with said second connecting portion and supported on the side of said horizontal part away from said backplane, and said through hole size in said gap direction is greater than the size of said second connecting portion in said gap direction, and said through hole size in said gap direction is greater than said through hole size perpendicular to said gap direction which is parallel to said backplane, and said through hole size perpendicular to said gap direction which is parallel to said backplane is greater than the size of said second connecting portion perpendicular to said gap direction and less than the size of said third connecting portion perpendicular to said gap direction.

2. The backlight module according to claim 1, wherein said first connecting portion, said second connecting portion and said third connecting portion are three coaxial cylinders.

3. The backlight module according to claim 1, wherein said connector is a screw, and said threaded hole is disposed on said backplane, and said first connecting portion of said connector connects to said backplane by said screw and are fixed in said threaded hole.

4. The backlight module according to claim 3, wherein said backplane further comprises a protrusion toward said horizontal part, and said threaded hole is provided in said protrusion, and said horizontal part provides with a concave used to put on said protrusion, and said concave size in said gap direction is greater than said protrusion size in said gap direction.

5. The backlight module according to claim 1, wherein said horizontal part and said vertical part are formed integrally.

6. The backlight module according to claim 1, wherein said backlight module further comprises the reflective film between said light guide plate and said backplane, and the optical film of said light guide plate away from the side of said backplane.

7. A backlight module, wherein said backlight module comprising:
   a backplane;
   a light guide plate, wherein said light guide plate is disposed on one side of said backplane;
   a heat dissipation element, wherein said heat dissipation element includes a horizontal part and a vertical part interconnected to each other, and said horizontal part is disposed on the other side of said backplane away from said light guide plate, and said vertical part is disposed next to light incident surface of said light guide plate;
   a light source, wherein said light source is disposed on one side of said vertical part close to said light incident surface;
   a connector, wherein said connector connects said heat dissipation element to said backplane and allows said heat dissipation element to move relatively to said backplane in the gap direction between said light guide plate and said light source.

8. The backlight module according to claim 7, wherein said horizontal part is provided with through hole, and said connector comprises the first connecting portion fixed on said backplane, the second connecting portion connected with said first connecting portion and disposed in said through hole and the third connecting portion connected with said second connecting portion and supported on the side of said horizontal part away from said backplane, and said through hole size in said gap direction is greater than the size of said second connecting portion in said gap direction.

9. The backlight module according to claim 8, wherein said through hole size in said gap direction is greater than said through hole size perpendicular to said gap direction which is parallel to said backplane.

10. The backlight module according to claim 8, wherein said through hole size perpendicular to said gap direction which is parallel to said backplane is greater than the size of said second connecting portion perpendicular to said gap direction and less than the size of said third connecting portion perpendicular to said gap direction.

11. The backlight module according to claim 8, wherein said first connecting portion, said second connecting portion and said third connecting portion are three coaxial cylinders.

12. The backlight module according to claim 8, wherein said connector is a screw, and said threaded hole is disposed on said backplane, and said first connecting portion of said connector connects to said backplane by said screw and are fixed in said threaded hole.

13. The backlight module according to claim 12, wherein said backplane further comprises a protrusion toward said horizontal part, and said threaded hole is provided in said protrusion, and said horizontal part provides with a concave used to put on said protrusion, and said concave size in said gap direction is greater than said protrusion size in said gap direction.

14. The backlight module according to claim 7, wherein said horizontal part and said vertical part are formed integrally.

15. The backlight module according to claim 7, wherein said backlight module further comprises the reflective film between said light guide plate and said backplane, and the optical film of said light guide plate away from the side of said backplane.

16. A liquid crystal display, wherein said liquid crystal display comprises a backlight module, wherein said backlight module comprising:
   a backplane;
   a light guide plate, wherein said light guide plate is disposed on one side of said backplane;
   a heat dissipation element, wherein said heat dissipation element includes a horizontal part and a vertical part interconnected to each other, and said horizontal part is disposed on the other side of said backplane away from said light guide plate, and said vertical part is disposed next to light incident surface of said light guide plate;
   a light source, wherein said light source is disposed on one side of said vertical part close to said light incident surface;
   a connector, wherein said connector connects said heat dissipation element to said backplane and allows said heat dissipation element to move relatively to said backplane in the gap direction between said light guide plate and said light source.

17. The backlight module according to claim 16, wherein said horizontal part is provided with through hole, and said connector comprises the first connecting portion fixed on said backplane, the second connecting portion connected with said first connecting portion and disposed in said through hole and the third connecting portion connected with said second connecting portion and supported on the side of said horizontal part away from said backplane, and said through hole size in said gap direction is greater than the size of said second connecting portion in said gap direction.

18. The backlight module according to claim 17, wherein said through hole size in said gap direction is greater than said through hole size perpendicular to said gap direction which is parallel to said backplane.

19. The backlight module according to claim 17, wherein said through hole size perpendicular to said gap direction which is parallel to said backplane is greater than the size of said second connecting portion perpendicular to said gap direction and less than the size of said third connecting portion perpendicular to said gap direction.

20. The backlight module according to claim 17, wherein said connector is a screw, and said threaded hole is disposed on said backplane, and said first connecting portion of said connector connects to said backplane by said screw and are fixed in said threaded hole, and said backplane further comprises a protrusion toward said horizontal part, and said threaded hole is provided in said protrusion, and said horizontal part provides with a concave used to put on said protrusion, and said concave size in said gap direction is greater than said protrusion size in said gap direction.

* * * * *